United States Patent [19]
Garnweidner

[11] Patent Number: 5,172,948
[45] Date of Patent: Dec. 22, 1992

[54] SHOCK ABSORBER FOR MOTOR VEHICLE BUMPERS AND THE LIKE

[75] Inventor: Peter Garnweidner, Lamprechtschausen, Austria

[73] Assignee: Austria Metall Aktiengesellschaft, Braunau am Inn, Austria

[21] Appl. No.: 793,541

[22] Filed: Nov. 18, 1991

[30] Foreign Application Priority Data

Nov. 16, 1990 [AT] Austria .................................. 2320/90

[51] Int. Cl.⁵ .............................................. B60R 19/34
[52] U.S. Cl. ...................................... 293/133; 188/371
[58] Field of Search ........................ 293/133, 155, 132; 188/371, 374, 377

[56] References Cited

U.S. PATENT DOCUMENTS

| 3,697,108 | 10/1972 | Diener | 188/371 X |
| 3,899,047 | 8/1975 | Maeda et al. | 293/133 X |
| 3,915,486 | 10/1975 | Maeda et al. | 293/133 |
| 4,823,923 | 4/1989 | Moyer | 293/133 X |

FOREIGN PATENT DOCUMENTS 2211560 9/1973 Fed. Rep. of Germany.
7617841 2/1982 France.

*Primary Examiner*—Dennis H. Pedder
*Attorney, Agent, or Firm*—Sixbey, Friedman, Leedom & Ferguson

[57] ABSTRACT

Shock absorber for motor vehicles having an outside tube and at least one inside tube, the tube lying on the inside projecting out of the outside tube and the part of the inside tube lying within the outside tube having a larger outside diameter than the inside diameter of the outside tube interacting with it. The tube lying on the outside has two bores going through it perpendicular to its lengthwise axis, and at least one of the bores is placed in the area containing the inside tube, and the inside tube has, in the area of this bore in the outside tube, continuous lengthwise slots that overlap the borehole. Holes are present on the car body that overlap the crosswise bores and screws are provided that go through the holes on the car body and the crosswise bores. The shock absorber absorbs force through deformation of the outside tube by the inside tube as it is pushed by an impact on a free end of the inside tube which may carry a vehicle bumper, for example.

18 Claims, 3 Drawing Sheets

SHOCK ABSORBER FOR MOTOR VEHICLE BUMPERS AND THE LIKE

BACKGROUND OF THE INVENTION

The invention relates to a shock absorber for motor vehicles, with tubes that can be pushed into one another. More specifically, to such a shock absorber for vehicle bumpers where the inside tube has an area whose outside contour is larger than the original inside contour of an adjacent area of the outside tube.

This design has the advantage that the deforming force remains approximately constant over the entire deformation path and the energy absorber thus can be deformed over its entire deformation length with the maximum force allowable for the entire structure.

Usual shock absorbers, today, are mostly provided with a flange and are either inserted from outside the vehicle into a component provided for it and screwed in, or are attached on a side member located inside the vehicle. These designs have the drawbacks that, during assembly of the vehicle, the shock absorber must first be brought into the vehicle body and attached and only then can the bumpers or the deflector be attached to it. A complete preassembly of the deflector or of the bumper together with the attachment and the shock absorbers is not possible with these designs.

In the variants inserted into the car body, the screws for attachment of the shock absorber are no longer accessible, and in shock absorbers located in the interior and attached to side members, it is not possible to insert them in the car body in this way, since the openings through the car body are not made large enough. The reason these openings cannot be dimensioned large enough is that too great a weakening of the vehicle structure would take place as a result.

In designs mounted on members, the attachment to the main axis of inertia of the member is eccentric, loading the member until it bends and making a larger design of the member necessary. In addition, also far more space is used up. Further, the shock absorbers attached to the vehicle members must be fixed on both sides with screws to achieve the necessary stability of the attachment. Thus, more screws must be used for attachment.

From German Offenlegungsschrift 24 60 598, a shock absorber of the above-mentioned type is known that is attached to the vehicle body by a mounting plate provided on the end of the outside tube facing away from the inside tube.

A similar type of attachment of a shock absorber with tubes lying inside one another, of which the outside tube widens in a collision, is also known from U.S. Pat. No. 3,915,486.

SUMMARY OF THE INVENTION

In contrast to the above-described prior art, according to an object of the invention, the attachment of the shock absorber is to be simplified.

This is achieved, according to a preferred embodiment of the present invention, in that the outside tube has at least two bores going through it perpendicular to its lengthwise axis, at least one of which is provided in an area in which the outside tube and the inside tube lie inside one another. Furthermore, the inside tube also has lengthwise slots that overlap at least the one bore and extend from the area of overlapping at least toward the side from which the inside tube is pushed into the outside tube. Still further, screws are provided that extend through the bores and also through these lengthwise slots where a bore is overlapped by the lengthwise slots and that can be conveyed through holes provided on the vehicle body and are able to be brought to overlap the bores.

This arrangement makes it possible to reduce the number of screw connections. This design exhibits no projecting fastening eyelets or catches whatsoever, so that it can be pushed into the car body from the outside through the existing opening. Easy positioning of the shock absorber relative to the lengthwise or crosswise axis of the vehicle can be achieved through the existing bores. Assembly can proceed with already-mounted bumpers, since all screw connections can easily be reached even after inserting the entire shock-absorber-bumper unit.

It is especially advantageous to arrange the attachment of the shock absorber so that it is located in the end area of a side member of the vehicle body. In this case, the screws go through holes in the side members, and the screws are placed in sleeves in the area between the inside walls of the side member of the vehicle body.

In this way, as in the known versions with flange attachment on the outside of the vehicle, a central introduction of force by the attachment screws in the side member of the car body can be achieved. To simplify assembly here and to avoid an undesired plastic deformation of the side member, a sleeve is placed around the screw. When the screw is tightened, the member is deformed slightly in the elastic area so that both ends of the sleeve are lined up on the inside walls of the member in the area around the holes in the member. The sleeves are, thus, already mounted in the shock absorbers and are inserted together with the latter in the side member.

It is further advantageous that the area of overlap between the bore and lengthwise slots lies at the ends of the lengthwise slots located farthest away in the outside tube. In this way, the deformation of the shock absorber is not hindered by the screws.

It is further advantageous to provide the inside tube with an area, following its area with the larger outside contour, whose outside contour corresponds to the original inside contour of the outside tube. In this way, a defined friction area that does not change during the deformation process is created between both tubes.

It is further advantageous for the lengthwise path of the lengthwise slots to be larger than the distance between the bore overlapping with it and the one next to it. In this way, the screw located in the lengthwise slot is not damaged at the end of the deformation path, and force is introduced during the further effect of a collision through both attachment screws.

To achieve simpler assembly, it is advantageous that a nut used to fasten each screw is made as a weld-on nut placed on the outside of the side member of the vehicle body.

To save weight, it is further advantageous according to the invention that the tubes that can be pushed into one another consist of a light metal, in particular an aluminum alloy.

To make an especially simple assembly possible, it is advantageous to place the screws in the vehicle body with a vertical lengthwise axis.

To avoid the penetration of dirt into the vehicle body in the area of the side member, it is advantageous according to the invention to place a seal between the side member and the inside tube projecting out of it, in the area of the end of the side member receiving the shock absorber.

These and further objects, features and advantages of the present invention will become apparent from the following description when taken in connection with the accompanying drawings which show, for purposes of illustration only, several embodiments in accordance with the present invention.

DETAILED DESCRIPTION OF THE PREFERRED EMBODIMENT

Figure 1:
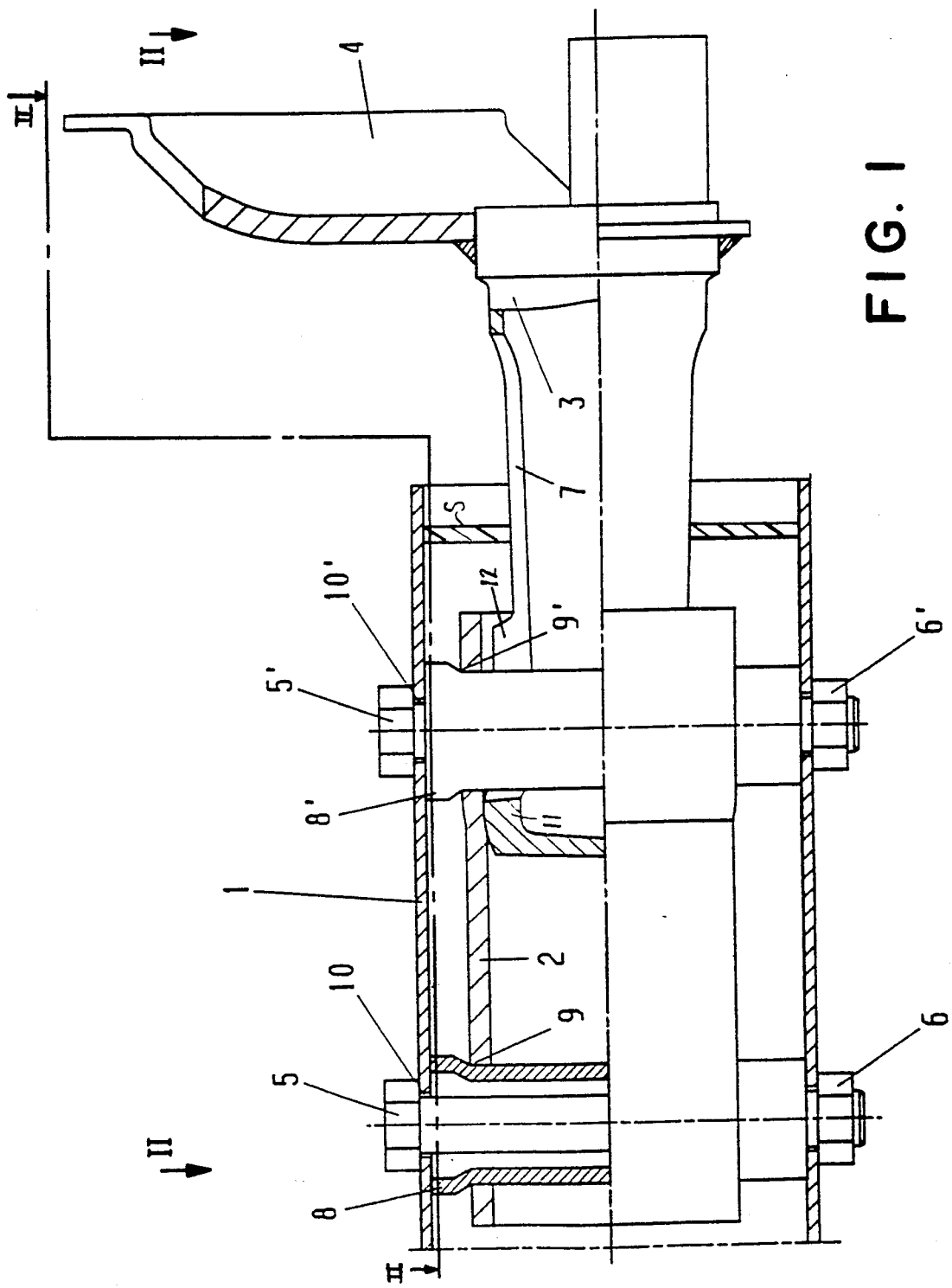
FIG. 1 is a lengthwise cut through a vehicle side member with installed shock absorbers according to a preferred embodiment of the invention.
Figure 2:
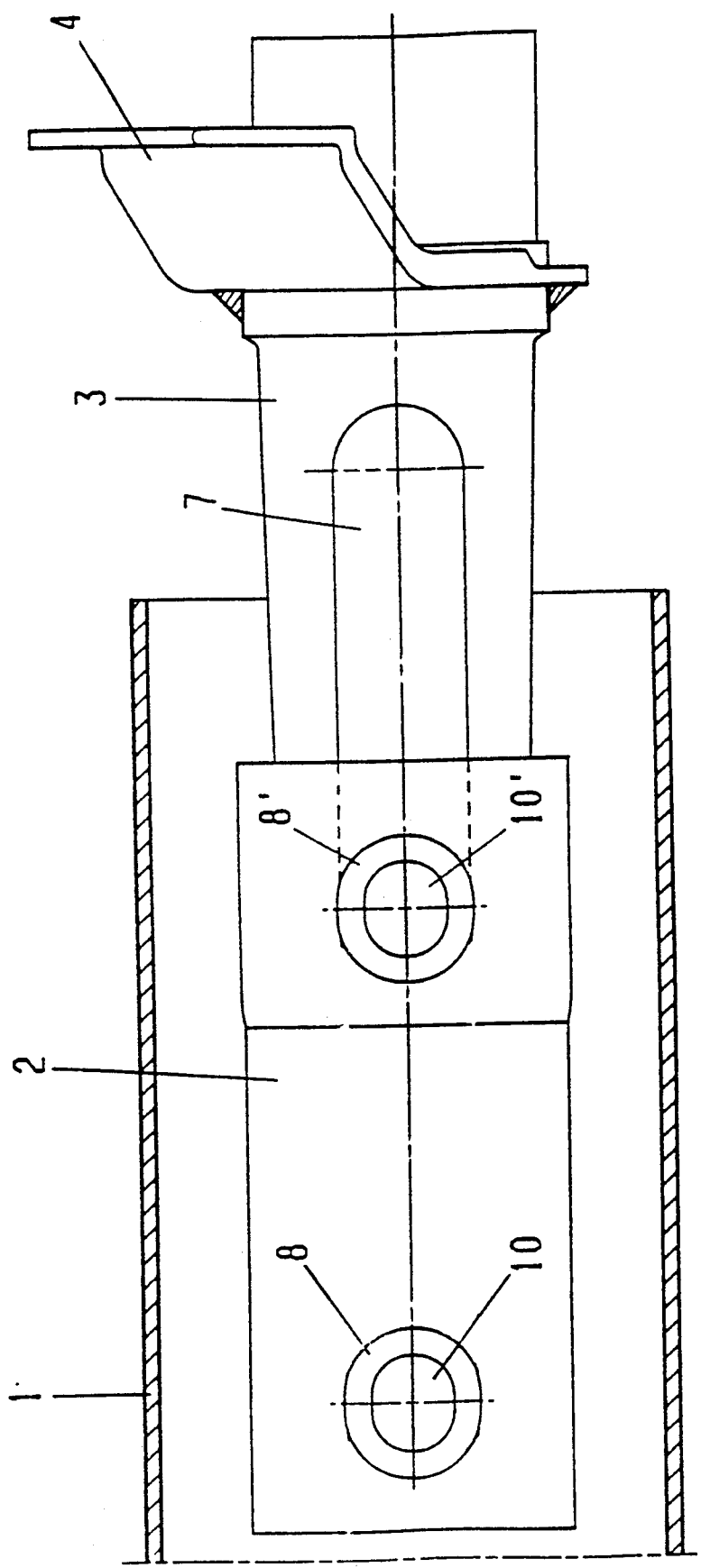
FIG. 2 is a top view taken along line II—II in FIG. 1.
Figure 3:
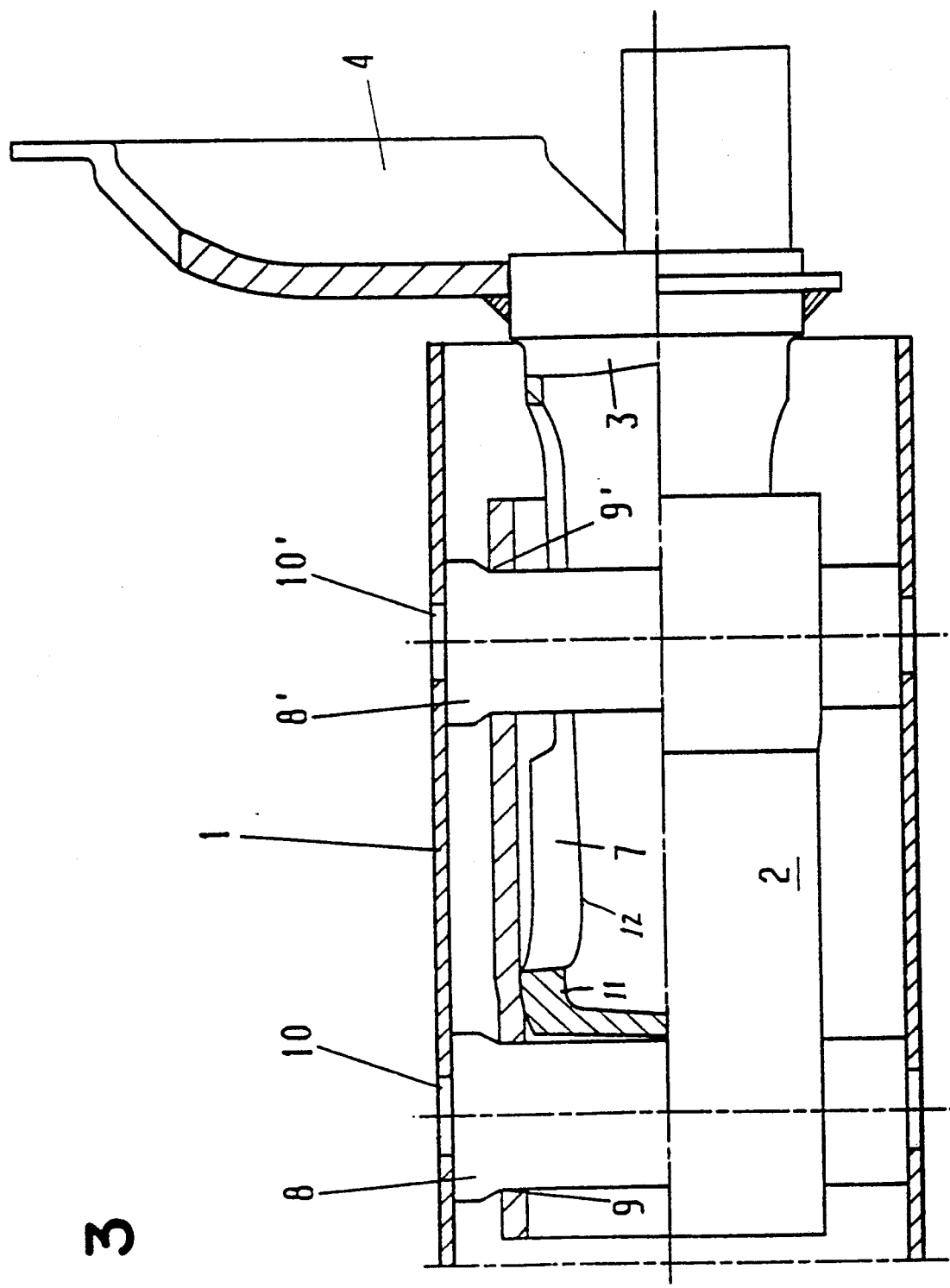
FIG. 3 is a lengthwise section corresponding to that shown in FIG. 1, but after a collision event.

The shock absorber of the illustrated preferred embodiment comprises an outside tube 2 and an inside tube 3 (which are preferably formed of a light metal, such as an aluminum alloy), and is placed in a vehicle side member 1. Inside tube 3 projects out of the vehicle body and has a recess member 4 for receiving a bumper (not shown). The shock absorber is fastened by screws 5, 5' and nuts 6, 6' to side member 1, the nuts 6, 6' can be made as weld-on nuts fixed on the outside of the side member 1. The screws go through bores 10, 10' in side member 1 and crosswise bores 9, 9' in the outside tube 2. To make assembly as simple as possible, sleeves 8, 8' are placed around the screws. In this way, the screws cannot be tightened so much that side member 1 is pressed in. Thus it is not necessary to attach additional reinforcement or a partition in side member 1.

Inside tube 3 has lengthwise slots 7 formed in it that are aligned with each other and that overlap the crosswise bore 9' of outside tube 2 that is located closer to the outer end of side member 1. In an area 11 of inside tube 3 that lies within outside tube 2, inside tube 2 has a larger outside contour than the original inside contour of outside tube 2 so as to produce deformation of the outside tube 2 as it is pushed into it. However, in an adjacent area 12, the outside contour of inside tube 3 is the same or somewhat smaller than the inside contour of outside tube 2, so as to provide a defined friction area between both tubes that does not change during the deformation process. To maximize the deformation path, the larger area 11 should be as far as possible from the inner screw 5.

In a collision, inside tube 3 is pushed further into the outside tube 2 and thus widens it. Inside tube 3 is additionally secured against turning during the deformation process by passage of the bolt 5' through the lengthwise slot 7. At the end of the collision event the inner end of inside tube 3 is adjacent screw 5. To achieve as great a deformation path as possible, lengthwise slots 7 are longer than the distance between the two screw connections, so that after the collision event the outer end of lengthwise slot 7 still is not in contact with screw 5' which, in this way, is not damaged at the end of the deformation path.

To avoid the penetration of dirt into the vehicle body in the area of the side member 1, it is advantageous according to the invention to place a seal S between the side member 1 and the inside tube 2 projecting out of it, in the area of the end of the side member 1 receiving the shock absorber.

While we have shown and described various embodiments in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

I claim:

1. Shock absorber for motor vehicles comprising tubes that can be pushed one into another, and an inside one of said tubes having a portion with an outside contour that is larger than an original inside contour of an adjacent area of an outside one of the tubes, such that the outside tube is deformed by pushing in of the inside tube into the outside tube; wherein the outside tube has at least two bores which extend through it perpendicular to a lengthwise axis thereof, at least one of said bores being located in an area in which a portion of the inside tube lies within the outside tube; wherein the inside tube has lengthwise slots which overlap said at least one of the bores and extend from the overlap at least toward an end of the inside tube located outside of the outside tube; and wherein screws are provided that extend through said bores and at least one said screw extends through the lengthwise slots said screws extending beyond the outside tube.

2. Shock absorber according to claim 1, wherein the outer tube is located in an end area of a side member of the vehicle body having inner walls and said screws pass through holes in the side members in such a manner that the screws extend between the inner walls of the side member of the vehicle body; and wherein sleeves that extend between said inner walls of the side member are disposed around the screws.

3. Shock absorber according to claim 2, wherein the overlap of said at least one bore and the lengthwise slots lies on an end of the lengthwise slots that is located farthest into the outside tube.

4. Shock absorber according to claim 3, wherein the inside tube has a second area whose outside contour is substantially matched to the undeformed inside contour of the outside tube, said second area following the portion of the inside tube having the larger outside contour, relative to a direction in which said inside tube has been pushed into said outside tube.

5. Shock absorber according to claim 1, wherein the overlap of said at least one bore and the lengthwise slots lies on an end of the lengthwise slots that is located farthest into the outside tube.

6. Shock absorber according to claim 1, wherein the inside tube has a second area whose outside contour is substantially matched to the undeformed inside contour of the outside tube, said second area following the portion of the inside tube having the larger outside contour, relative to a direction in which said inside tube has been pushed into said outside tube.

7. Shock absorber according to claim 1, wherein wherein at least one of the bores is located a distance inwardly of the lengthwise slot and the at least one bore that overlaps the lengthwise slot, and the length of the lengthwise slot is greater than said distance.

8. Shock absorber according to claim 2, wherein a nut is provide for fastening each screw, said nut being a weld-on nut on an outer side of the side member of the vehicle body.

9. Shock absorber according to claims 1, wherein the tubes are made of an aluminum alloy.

10. Shock absorber according to claim 2, wherein the screws are oriented in the vehicle body with a vertical lengthwise axis.

11. Shock absorber according to claim 2, wherein, in the end area of the side member, a seal is located between the side member and the inside tube, said inside tube projecting out of said end area of the side member.

12. Shock absorber according to claim 2, wherein the inside tube has a second area whose outside contour is substantially matched to the undeformed inside contour of the outside tube, said second area following the portion of the inside tube having the larger outside contour, relative to a direction in which said inside tube has been pushed into said outside tube.

13. Shock absorber according to claim 12, wherein at least one of the bores is located a distance inwardly of the lengthwise slot and the at least one bore that overlaps the lengthwise slot, and the length of the lengthwise slot is greater than said distance.

14. Shock absorber according to claim 2, wherein at least one of the bores is located a distance inwardly of the lengthwise slot and the at least one bore that overlaps the lengthwise slot, and the length of the lengthwise slot is greater than said distance.

15. Shock absorber according to claim 14, wherein the overlap of said at least one bore and the lengthwise slots lies on an end of the lengthwise slots that is located farthest into the outside tube.

16. Shock absorber according to claim 1, wherein an outer free end portion of the inside tube carries a bumper mounting member.

17. Shock absorber according to claim 2, wherein an outer free end portion of the inside tube carries a bumper mounting member.

18. Shock absorber according to claim 17, wherein, in an end area of the side member, a seal is located between the side member and the inside tube, and wherein said free end portion of the inside tube projects outwardly beyond said end area of the side member.

* * * * *